United States Patent [19]

Chen-Chao

[11] Patent Number: 5,588,630
[45] Date of Patent: Dec. 31, 1996

[54] ADJUSTABLE BASE TO HOLD FLAG BANNERS

[76] Inventor: Huang Chen-Chao, No. 20, Lane 124, Sec. 5, Hsin Hai Rd., Taipei, Taiwan

[21] Appl. No.: 374,826

[22] Filed: Jan. 19, 1995

[51] Int. Cl.$^6$ ............................................. F16M 13/00
[52] U.S. Cl. ........................... 248/514; 248/515; 248/520
[58] Field of Search ................................. 248/514, 515, 248/516, 520

[56] References Cited

U.S. PATENT DOCUMENTS

| | | | |
|---|---|---|---|
| 3,161,390 | 12/1964 | Larson | 248/514 |
| 4,477,149 | 10/1984 | Crespy | 248/487 |
| 4,827,654 | 5/1989 | Roberts | 248/514 |
| 5,310,155 | 5/1994 | Wu | 248/514 |
| 5,367,815 | 11/1994 | Liou | 248/514 |
| 5,396,915 | 3/1995 | Bomar | 248/514 |

Primary Examiner—Leslie A. Braun
Assistant Examiner—Willie Berry, Jr.
Attorney, Agent, or Firm—Morton J. Rosenberg; David I. Klein

[57] ABSTRACT

An adjustable base to hold flag banner poles includes a base and a cylinder which can be adjusted to a certain angular degree. At the base of the cylinder a connecting table is provided for engagement with a base table with a meshing means to couple together the cylinder and the base. On the outside of the cylinder two small round loops are formed to receive and secure another small flag banner pole therein.

2 Claims, 3 Drawing Sheets

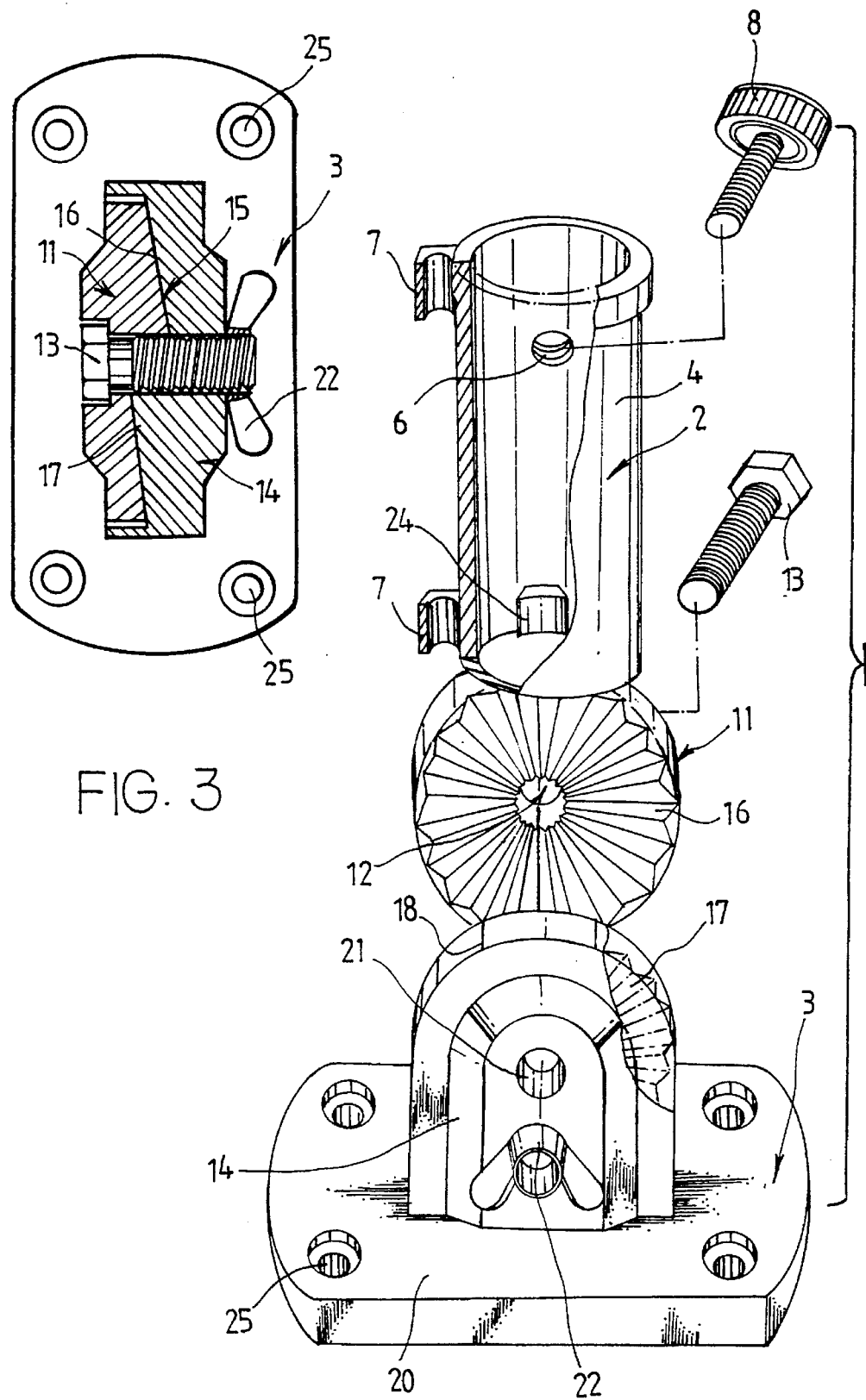

ADJUSTABLE BASE TO HOLD FLAG BANNERS

FIELD OF THE INVENTION

The present invention relates to an adjustable base to hold flag banners. More particularly, the present invention is directed to an adjustable base which can be adjusted to different angles so that flag banners are viewed flying in a row at the same degree of angle.

BACKGROUND OF THE INVENTION

In general, many kinds of banners are fixedly coupled to flag pole bases mounted on a wall at a certain angle. The prior art method of making such a flag pole base is by manually molding it the manufacturing cost is high and takes a lot of time to produce a flag pole base. The quality of the flag pole base is poor and is easily rusted. When the flag poles are secured to the flag pole bases that are mounted on a wall at a certain angle, the flags and flag banners are not viewed at the same angle, because of weight of the flag poles and the effect of wind.

OBJECTS OF THE INVENTION

It is the main object of this invention to provide an adjustable flag pole base to fixedly hold flag poles at a certain angle, and solve the shortcomings of conventional flag pole bases, which cannot hold a flag banner at a certain angle for a long time because of the effects of the weight of the flag pole and wind.

The second object of this invention is to provide an adjustable base that has two small loops to hold a small flag banner so that a big flag banner and a small flag banner are flying at the same time.

Other purposes, structure and functions of this invention will become apparent from the drawings and specific description of the preferred embodiment of this invention.

SUMMARY OF THE INVENTION

According to a broad aspect of the present invention, there comprises an adjustable base, a cylinder to hold a flag banner pole, a meshing means to couple the adjustable base to the cylinder at a certain angle and tighten it, and a ground board to fix the adjustable base on a wall or on any unmovable object.

BRIEF DESCRIPTION OF THE DRAWINGS

FIG. 2 is an exploded view, partially sectioned, of the structure of the present invention, wherein a portion of the flag pole cylinder can be seen;

FIG. 3 shows a cross-sectional view of flag pole base 3 taken along the section line 3—3 of FIG. 1.

DESCRIPTION OF THE PREFERRED EMBODIMENT

Figure 1:
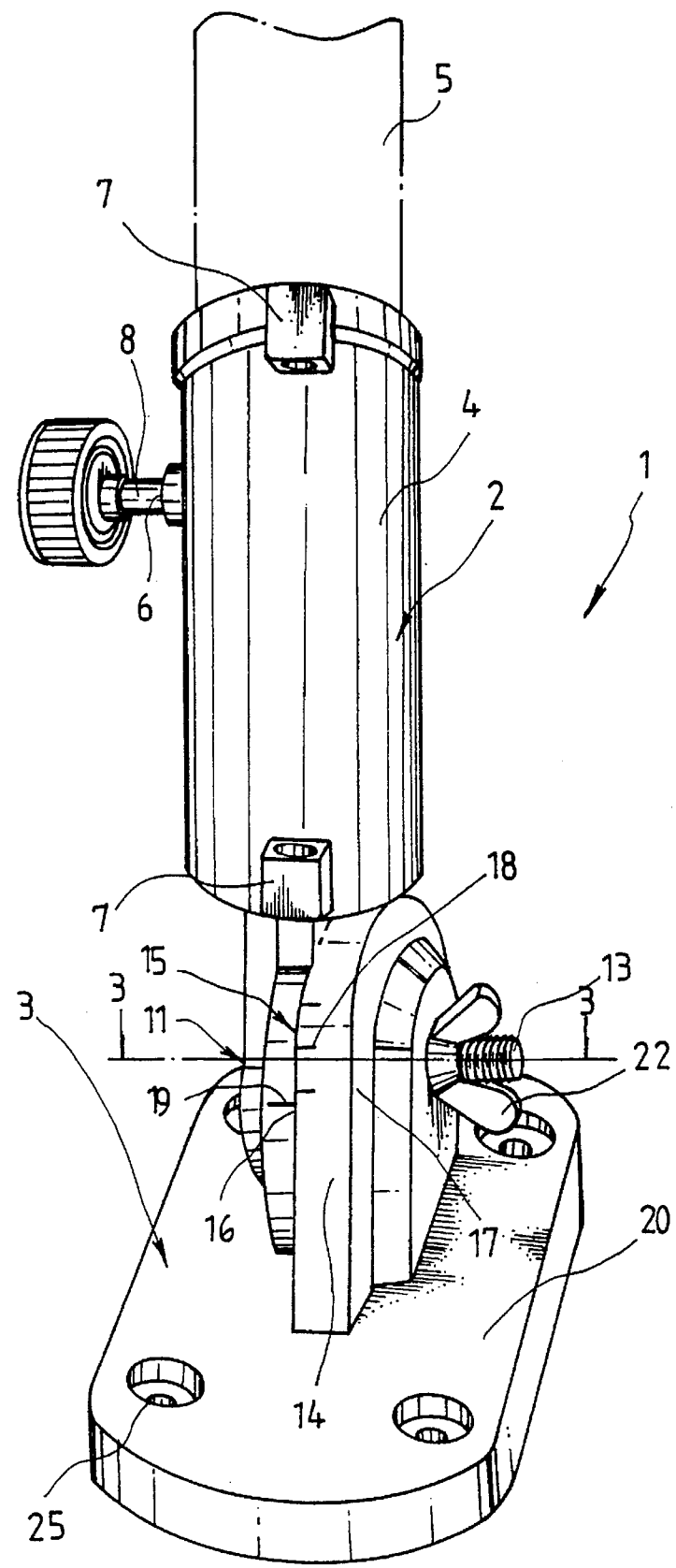
FIG. 1 is a perspective view of the present invention, wherein the dotted line represents a portion of a flag pole.
Figure 4:
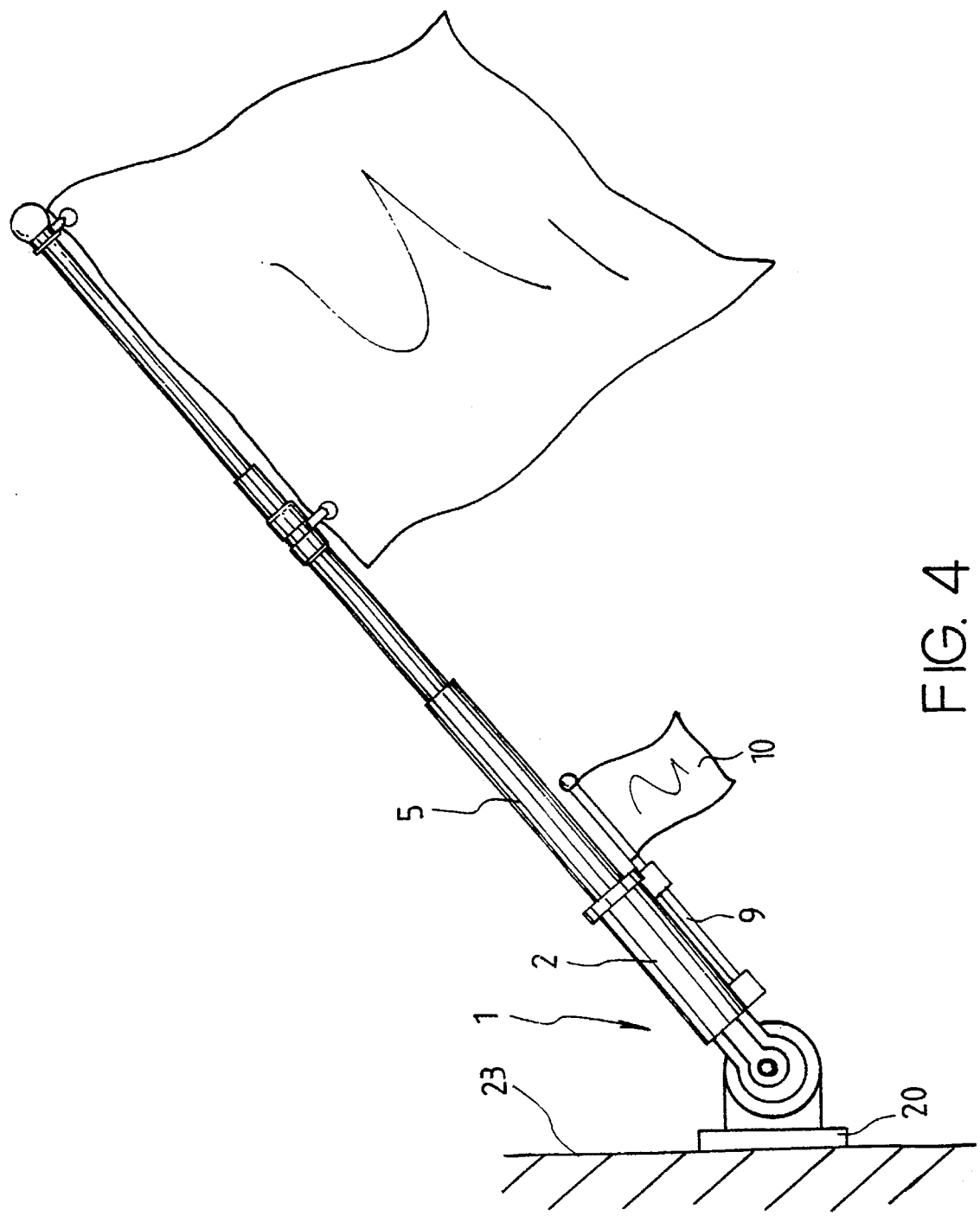
FIG. 4 is a side view showing the adjustable base mounted on a wall in use with two flag banners flying.

As FIG. 1 and FIG. 2 show, the adjustable base 1 for holding flag banners comprises a flag banner pole cylinder 2 and a base 3. Flag banner pole cylinder 2 comprises one long concave cylinder 4 which has suitable diameter and an open hole to receive the flag banner pole 5 therein, as shown in FIGS. 1 and 4. The outside surface of the cylinder 4 has a threaded opening 6 for receiving a screw bolt 8 therein to secure the flag banner pole 5 within the cylinder 4. Inside, and at the bottom of the cylinder, there is a protrusion 24 for contacting the flag banner pole 5 and aiding in securing the pole when bolt 8 is tightened.

On another side of the flag banner pole cylinder two small round loops 7 are provided to receive a small flag banner pole 9 therein, and thereby fly a small flag banner 10, as shown in FIG. 4. Under the cylinder 4 a connecting round table 11 is formed. A screw hole 12 is formed at the center of the connecting round table 11 and a screw bolt 13 passes therethrough to fasten the flag banner cylinder to the base table 14 of the base 3. The connecting round table 11 is meshed with the base table 14 and has a meshing means 15, as shown in FIG. 3. At the center of the meshing means 15 is the screw hole 12.

The connecting round table and the base round table are meshed with cogwheel teeth. The connecting round table 11 has upper cogwheel teeth 16 and the base table 14 has lower cogwheel teeth 17. The upper cogwheel teeth are meshed with the lower cogwheel teeth to adjust the angular degree of the cylinder 4. The peripheral edge of the connecting round table has upper angular degree markings 18, and the peripheral edge of the base table has lower angular degree markings 19. The upper angular degree markings are put together with the lower angular degree markings to indicate the angle of the flag banner cylinder.

As FIGS. 1 and 2 show, the base of this invention comprises a ground plate 20 and a base table 14. The base board is a plate having several fixing holes 25 formed therethrough to fix the adjustable base on a wall or other unmovable objects, as shown in FIG. 4. The base table 14 is formed vertically at the center of the ground plate 20. At the center of the base table, a screw hole 21 is formed. A screw bolt 13 is passed through the screw holes 12 and 21 for coupling the connecting table 11 to the base table 14. After adjusting the angular degree of the cylinder of the flag banner pole, a nut 22 engaged on the screw bolt 13 is tightened, as shown in FIG. 3.

The method of using this invention is as follows. First, the adjustable base 1 is put at the desired spot 23 on the wall and secured there by screws, as shown in FIG. 3. Then the screw bolt 13 and the nut 22 of the screw bolt can be loosened to adjust the angular degree of the flag banner pole cylinder 2. After the angle of the cylinder is determined, then the nut 22 on the screw bolt 13 can be tightened to mesh the upper cogwheel teeth 16 and the lower cogwheel teeth 17. The flag banner pole cylinder 2 is fixed in this way. The flag banner pole 5 and the small flag banner pole 9 can then be put into the flag banner pole cylinder.

I claim:

1. An adjustable base for holding a pair of flag banner poles, comprising:

a base including (1) a ground plate having a plurality of mounting holes formed therethrough for securement to a base surface, and (2) a base table extending orthogonally from a central portion of said ground plate, said base table having a centrally disposed first screw hole formed therethrough and a plurality of radially disposed first cogwheel teeth formed on one side thereof;

a pole cylinder adjustably coupled to said base, said pole cylinder including (1) a longitudinally extended tubular cylinder having an open upper end for receiving a first of the pair of flag banner poles therein, said tubular cylinder having a threaded opening formed through a side wall thereof adjacent said open end, (2) a first bolt threadedly engaged with said threaded opening for securing the first of the pair of flag banner poles within said tubular cylinder, (3) a connecting table extending from a lower end of said tubular cylinder, said connecting table having a centrally disposed second screw hole formed therethrough and a plurality of radially disposed second cogwheel teeth formed on one side thereof, and (4) a pair of longitudinally spaced loops formed on an external surface of said tubular cylinder for receiving a second of the pair of flag banner poles therein; and, means for releasably coupling said connection table to said base table, said releasable coupling means including a second bolt extending through said first and second screw holes with said first cogwheel teeth facing said second cogwheel teeth and a nut threadedly engaged on said second bolt, wherein said tubular cylinder is angularly adjusted by rotation of said connection table relative to said base table and fixed thereat by tightening said nut on said second bolt.

2. The adjustable base as recited in claim 1 where said tubular cylinder includes a protrusion formed on an internal surface thereof adjacent said lower end for contacting the first of the pair of flag banner poles within said tubular cylinder and aiding in its securement therein.

\* \* \* \* \*